United States Patent
Blood et al.

(10) Patent No.: US 11,261,813 B2
(45) Date of Patent: Mar. 1, 2022

(54) SYSTEMS, METHODS AND APPARATUSES FOR WET STACK RESIDUE MITIGATION

(71) Applicant: Schweitzer Engineering Laboratories, Inc., Pullman, WA (US)

(72) Inventors: Ellery A. Blood, Moscow, ID (US); Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/147,584

(22) Filed: Jan. 13, 2021

(65) Prior Publication Data

US 2021/0131371 A1    May 6, 2021

Related U.S. Application Data

(62) Division of application No. 16/600,623, filed on Oct. 14, 2019, now Pat. No. 10,920,703.

(51) Int. Cl.
*F02D 29/06* (2006.01)
*F02D 41/14* (2006.01)
*F02B 77/04* (2006.01)
*F02B 77/08* (2006.01)

(52) U.S. Cl.
CPC .......... *F02D 41/1467* (2013.01); *F02B 77/04* (2013.01); *F02B 77/083* (2013.01); *F02D 29/06* (2013.01); *F02D 2200/021* (2013.01); *F02D 2200/0611* (2013.01); *F02D 2200/10* (2013.01)

(58) Field of Classification Search
CPC .. F02D 29/06; F02D 41/1467; F02D 2200/10; F02B 77/04; F02B 77/083
See application file for complete search history.

(56) References Cited

U.S. PATENT DOCUMENTS

| | | | |
|---|---|---|---|
| 6,732,052 B2 | 5/2004 | Macdonald |
| 6,848,419 B1 | 2/2005 | Donaldson |
| 7,607,289 B2 | 10/2009 | Schmeichel |
| 7,948,105 B2 | 5/2011 | Agrawal |
| 8,068,937 B2 | 11/2011 | Eaves |
| 8,291,587 B2 | 10/2012 | St. Mary |
| 8,327,631 B2 | 12/2012 | Caro |
| 9,184,795 B2 | 11/2015 | Eaves |
| 9,487,722 B2 | 11/2016 | Bai |
| 9,853,689 B2 | 12/2017 | Eaves |
| 2005/0120715 A1 | 6/2005 | Labrador |
| 2008/0161974 A1 | 7/2008 | Alston |
| 2009/0228149 A1 | 9/2009 | Alton |

(Continued)

OTHER PUBLICATIONS

Carpenter, Anne M. "Advances in Multi-Pollutant Control" Nov. 2013.

(Continued)

*Primary Examiner* — Audrey B. Walter
(74) *Attorney, Agent, or Firm* — Stoel Rives LLP; Richard M. Edge

(57) ABSTRACT

An intelligent electronic device (IED) may monitor wet stack residue buildup of a diesel engine. Once the wet stack residue accumulates to a certain amount, the IED may perform a mitigation procedure. Additionally, tracking wet stack residue buildup may allow an IED to attempt to prevent or reduce accumulation of the wet stack residue. The IED may track an operating power level of the diesel engine to estimate the rate of residue buildup.

4 Claims, 5 Drawing Sheets

(56) References Cited

U.S. PATENT DOCUMENTS

| | | |
|---|---|---|
| 2009/0234512 A1 | 9/2009 | Ewing |
| 2010/0313418 A1 | 12/2010 | S. Mary |
| 2014/0338864 A1* | 11/2014 | Danforth, III ...... F02D 41/0245 165/104.19 |
| 2018/0059700 A1* | 3/2018 | Steffen ...................... H02J 3/46 |
| 2019/0178155 A1* | 6/2019 | Maxwell ............... F02B 63/048 |
| 2020/0111176 A1 | 4/2020 | Schweitzer |
| 2020/0153251 A1* | 5/2020 | Frampton ................. H02J 3/42 |

OTHER PUBLICATIONS

MQ Power "Power Balance" Jul. 2017.

Maalouf, Dany "Wet Stacking Effects on Diesel Engine & Prevention" May 18, 2015.

Elif Uysal-Biyikoglu, et. al "Energy-Efficient Packet Transmission Over a Wireless Link", IEEE/ACM Transactions on Networking, vol. 10, No. 4, Aug. 2002.

Erol Gelenbe, et al. "Central or Distributed Energy Storage for Processors with Energy Harvesting", 2015 Sustainable Internet and ICT for Sustainability (SustainIT), IEEE, Apr. 2015.

Erol Gelenbe and Elif Tugce Ceran "Energy Packet Networks with Energy Harvesting", IEEE Access, vol. 4, Mar. 2016.

A. Monti, et. al "Towards a Real Digital Power System An Energy Packet Approach", 2017 IEEE Conference on Energy Internet and Energy System Integration (EI2), Nov. 2017.

Roberto Rojas-Cessa, et. al "An Energy Packet Switch for Digital Power Grids", 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 2018.

Van Smon, et al "Local Voltage-Stability Index Using Tellegen's Theorem", IEEE Transactions on Power Systems, vol. 21. No. 3, Aug. 2006.

PCT/US2019/054180 Patent Cooperation Treaty, International Search Report and Written Opinion of the International Searching Authority, Jan. 2, 2020.

Engineering Institute of Technology "Fundamentals of Smart Metering—kWh and kVArh Meters" Article [online]. Jul. 13, 2017 [retrieved Dec. 3, 2019]. Retrieved from <URL:https:www.eit.edu.au/cms/resources/technical-resourses/fundamentals-of-smater-metering-kwh-and-kvarh-meters-2>.

Schneider Electric "PowerLogic-™ PM5100 Series Power and Energy Meter" User Manual [online]. Mar. 2017 [retrieved Dec. 4, 2019], Retrieved from <URL: https://download.schneider-electric.com/files?p_enDocType=User+guide&p_File_Name=EAV15105-EN05.pdf&p_Doc_Ref=EAV15105-EN>.

Yokogawa "How to Measure Electrical Power" Article [online]. 2017 [retrieved Dec. 4, 2019]. Retrieved from <URL:https://tmi.yokogawa.com/US/library/resources/application-notes/how-to-measure-electrical-power/>.

"How to Avoid Wet Stacking Industrial Generators," May 3, 2019, Axiom Equipment Group (Year: 2019).

* cited by examiner

SYSTEMS, METHODS AND APPARATUSES FOR WET STACK RESIDUE MITIGATION

RELATED APPLICATIONS

This application claims priority under 35 U.S.C. §§ 120 and 121 as a divisional application of U.S. patent application Ser. No. 16/600,623 filed on 14 Oct. 2019 naming Ellery A. Blood and Scott M. Manson as inventors and titled "Systems, Methods and Apparatuses for Wet Stack Residue Mitigation" which is incorporated herein by reference in its entirety.

TECHNICAL FIELD

The present disclosure relates to diesel engine wet stack residue monitoring, mitigation, and prevention.

BRIEF DESCRIPTION OF THE DRAWINGS

Non-limiting and non-exhaustive embodiments of the disclosure are described herein, including various embodiments of the disclosure with reference to the figures listed below.

Figure 1:
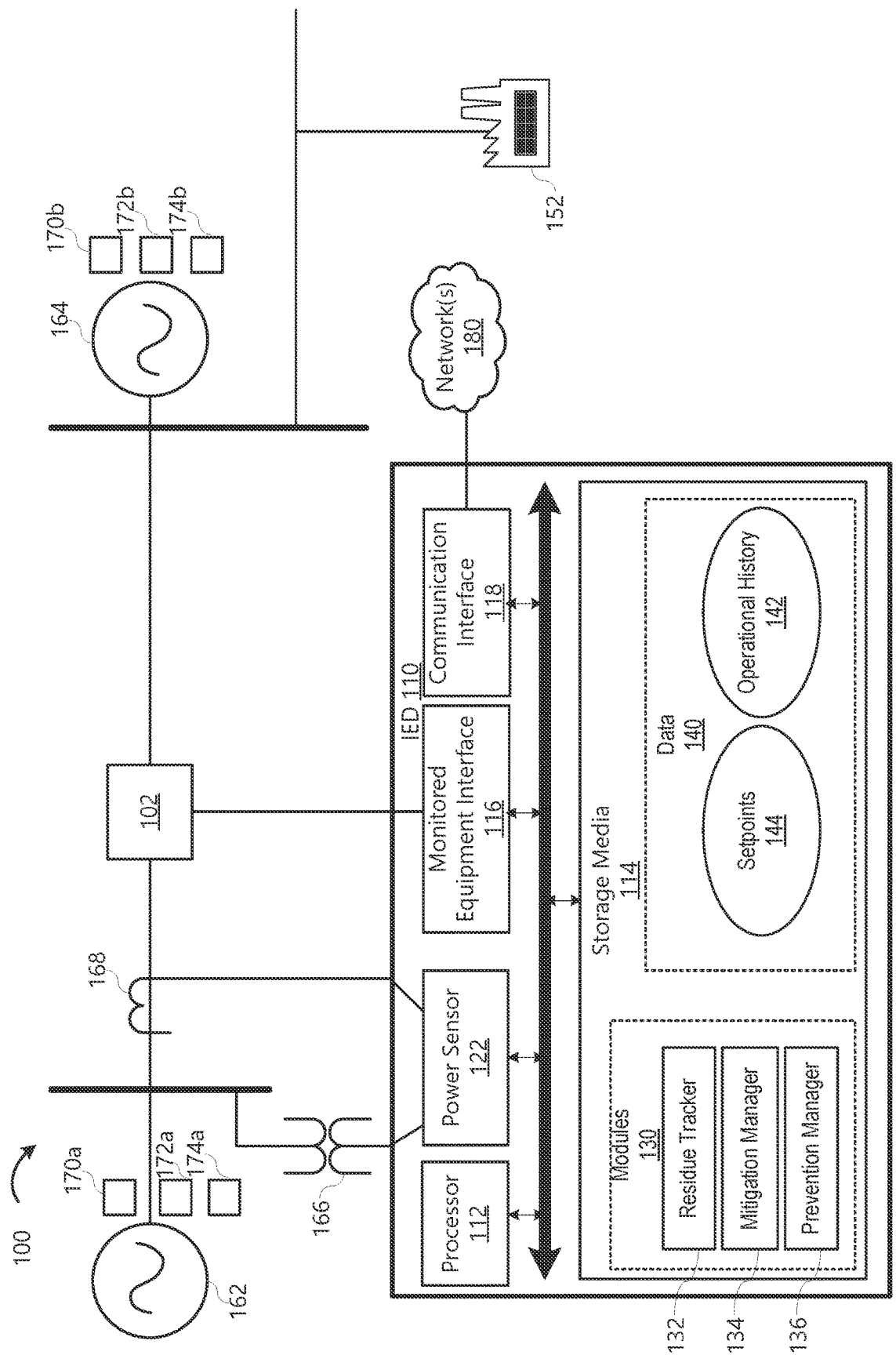
FIG. 1 is a block diagram of an electric power delivery system including an intelligent electronic device (IED) for monitoring, mitigating, and preventing wet stacking.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Diesel engines are susceptible to a condition known as wet stacking. A diesel engine combusts diesel fuel inside pistons to create mechanical power. Diesel fuel is composed of various species of hydrocarbons. Hydrocarbons built of short chains tend to be highly volatile and readily combustible. Hydrocarbons that are built of longer chains are less volatile and may not fully combust depending on the engine operating conditions.

Diesel engines typically use one of two types of fuel injection systems: mechanical and electronic. The mechanical fuel injection systems are typically optimized to have the best performance (e.g., highest percentage of fuel burned inside the cylinder) over a range of approximately 60% to 100% of rated power of the diesel engine. Electronically fuel injected engines are able to optimize fuel burn over a wider operating range, typically achieving efficient fuel burn from 30% to 100% of rated power of the diesel engine. When the diesel engine is not operated at peak efficiency, the long-chain hydrocarbons tend to suffer incomplete combustion and escape in the exhaust. The incompletely combusted long-chain hydrocarbons tend to accumulate inside the exhaust plenum (e.g., exhaust manifold), on the valves, and on other exhaust related components. This accumulation is known as wet stacking.

If the diesel engine is operated at high power levels, the exhaust components will maintain a temperature above the vaporization point of these long-chain hydrocarbons, preventing their buildup. If the exhaust components do not maintain that high temperature, the long-chain hydrocarbon residue will build up resulting in the wet stacking condition.

Wet stacking causes various maintenance and operational conditions, such as restricting of exhaust channels, impeding the proper closure of combustion cylinder valves, forming viscous liquid hydrocarbon residue around exhaust pipe connections and around the turbo, and emitting exhaust with high carbon particulate content from the stack when under constant load. Permanent damage can occur as the deposits erode the engine surfaces. An engine is disassembled and overhauled to remove the residue if it is allowed to build up to these levels.

Several methods can be used for mitigating wet stacking residue buildup. Some manufacturers use an electronically controlled thermostat to throttle engine coolant. Periodically the coolant thermostat valve is closed to reduce the flow of coolant through the engine. This results in an overall temperature increase for the engine, with a marginal temperature increase for the exhaust plenums. In order to increase the exhaust plenum temperature to sufficient levels that wet stacking residue is burned off, the engine is subjected to temperatures that reduce the lifetime of seals and gaskets.

Additionally, fuel additives may be used. Fuel additives are available that can increase the rate of combustion of the long-chain hydrocarbons that can accumulate in the exhaust system. These reduce the accumulation when the additive is present, but do not generally act to reduce already accumulated residue. Including fuel additives adds a maintenance load to operators as well as a requirement to track and transport potentially hazardous chemicals.

Another method to mitigate wet stack residue includes load bank burnoff. Using this method to minimize wet stacking residue mitigation, the machines are operated at a high power level (typically greater than 80% of rated power) for several hours. This is commonly accomplished by attaching a resistive load bank to increase the machine load and operate the machine at near full power for greater than eight hours. This is effective at mitigating the buildup but expends significant fuel in the process. This method is undesirable in multiple ways. This method increases operational costs in the form of the cost of purchasing additional fuel for this operation. This method increases operating costs due to the cost of purchasing, transporting, and maintaining the load bank. As diesel generation is often used in remote areas, the expense of transporting the fuel to the generator location is also a significant cost. For military applications, transporting fuel requires caravans, which put soldiers' lives in danger. So, minimizing fuel usage has a direct savings in terms of military casualties. Additionally, since the burnoff of accumulated residue is typically not tracked, the mitigation operation may continue past the point that the residue is removed, wasting fuel.

As traditional methods of mitigation are undesirable and should be minimized whenever possible, it is beneficial to accurately track residue accumulation. This enables scheduling mitigation when and where it is necessary and avoiding it when it is not necessary. Periodic mitigation based on average power levels is effective but not economical. Implementing a method to accurately track the residue mitigation would allow mitigation activities to be optimized.

The present disclosure provides systems and methods to monitor, identify, mitigate, and prevent a wet stack condition. In some embodiments, the systems and methods track operating conditions of a diesel engine to determine a wet stack condition. In some embodiments, the systems and methods alter a dispatch command for output power from a diesel engine or may alter a load associated with the diesel engine to increase an operating power level to mitigate a wet stack condition. In some embodiments, the systems and methods minimize an amount of time that a diesel engine spends operating at less than peak efficiency.

The systems and methods described herein may provide superior results compared to conventional mitigation techniques. For example, the systems and methods described herein may heat the exhaust plenum, limiting the need for exhaust fluid to keep a catalytic device clean. Using the systems and methods described herein may also reduce power and fuel associated with a periodic maintenance program using load banks. Additionally, the systems and methods may reduce emissions, and may not increase the engine temperatures with an electronically controlled thermostat to reduce engine deterioration.

While many embodiments described below refer to diesel engine generators, the systems and methods described herein may be applied to any engine that is susceptible to a wet stack condition.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term intelligent electronic device (IED) may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once, unless otherwise specified.

FIG. 1 is a block diagram of an electric power delivery system 100 including an intelligent electronic device (IED) 110 for monitoring, mitigating, and preventing wet stacking in one or more electric power generators (e.g., first generator 162, second generator 164, together referred to as the electric power generators 162, 164).

Electric power delivery systems have been designed for the safe and reliable generation, transmission, and distribution of electric power to consuming loads. The electric power delivery system 100 comprises various equipment such as the one or more electric power generators 162, 164, buses, transmission lines, transformers, smart distribution nodes 102, distribution lines, and the like for generating, transmitting, and delivering energy to a load 152.

Adding the IED 110 that is capable of monitoring, mitigating, and preventing wet stacking may make the electric power delivery system 100 more reliable and require less maintenance. While the illustrated embodiment includes an IED 110 that performs functions to monitor, mitigate, and prevent wet stacking, in some embodiments, these functions may be performed by three separate IEDs. In some embodiments, the electric power delivery system 100 may include an IED that performs a subset of monitoring, mitigating, and preventing wet stacking. For example, the electric power delivery system 100 may include an IED that monitors for wet stacking and alerts a technician when mitigation is needed. Similarly, some embodiments of the electric power delivery system 100 may include an IED that performs functions to mitigate or prevent the wet stacking.

Electric power delivery systems 100 may include one or more diesel engine generators. In the illustrated embodiment, the first generator 162 and the second generator are diesel generators. Diesel generators are susceptible to wet stacking. Generators are typically sized for the maximum expected load. The generators may be operated independently (e.g., as backup generation for a building), or as a small microgrid. In these use cases the generators may operate at low power levels (e.g., less than 30%) for extended periods of time, allowing wet stacking residue accumulation. For example, a remote microgrid (for example, military outposts) will likely suffer from wet stacking residue accumulation because the generators run constantly to provide a base load power, but only approach rated loading during peak working hours.

The diesel generators may also be employed in a "peak shaving" role. In this usage case, an industrial plan may be contractually obligated to the utility to maintain their peak power usage below a negotiated value. The generator would then be dynamically dispatched to maintain the power draw at the Point of Common Coupling (PCC) below the negotiated value. Depending on fuel prices or environmental regulations, it may be advantageous to minimize the power from the generators to only what is necessary to comply for the contract. In this situation, the IED 110 can monitor the accumulation of wet stacking residue over time. When the levels indicate that mitigation is necessary, the IED 110 may instruct the generators to temporarily switch to a base load profile where they operate at near full rated power.

The IED 110 may comprise a power sensor 122, a processor 112, a monitored equipment interface 116, a communication interface 118, and storage media 114. A system bus may facilitate communication and/or interaction between the other components. The IED 110 may monitor, mitigate, and prevent wet stacking in the electric power generators 162, 164.

The IED 110 may obtain power system signals from portions of the electric power delivery system 100 either directly (as illustrated) or indirectly from various devices such as merging units. Electric power system signals may be obtained using instrument transformers such as current transformers (CTs) 168, potential transformers (PTs) 166, and the like. The IEDs 110 may use power system signals such as signals representing current and voltage to determine an output power of the electric power generators 162, 164 with a power sensor.

The IED 110 may be configured to track wet stack residue buildup and burnoff by monitoring operating conditions of the electric power generators 162, 164. The residue accumulation rate is dependent on multiple factors. Firstly, accumulation is based on the fraction of fuel that is burned to produce power. The less efficiently fuel is burned, the more unburned fuel exists in the cylinder to be potentially deposited on or inside the exhaust components. Factors affecting fuel burn include: power level, altitude (air pressure), humidity, air temperature, and fuel quality/composition. Secondly, accumulation is based on the exhaust components and exhaust flow rate. Hotter exhaust components will tend to accumulate less residue, and exhaust moving at a higher flow rate will tend to deposit less. Both of these factors are related to power level (higher power leads to hotter exhaust components and faster flow of exhaust gasses).

In some embodiments, the IED 110 may monitor an operating power level of the electric power generators 162, 164. In some embodiments, the IED 110 may include a power sensor 122 configured to receive CT and PT secondaries and condition the signals received therefrom for use by the IED 110. Signal conditioning may include various filters, step-down transformers, analog-to-digital converters (A/D) and the like to produce digitized analog signals. In various embodiments, digitized analog signals may be provided by other devices such as merging units.

In some embodiments, the IED 110 may monitor additional factors that can affect wet stack residue buildup and burnoff. For example, in some embodiments, the IED 110 may receive coolant temperature measurements from coolant thermometers 170a, 170b. In some embodiments, the IED 110 may receive exhaust temperature measurements from exhaust thermometers 172a, 172b. In some embodiments, the IED 110 may estimate the exhaust temperature from a plurality of other measurements. In some embodiments, the IED 110 may receive measurements of exhaust content such as particulate carbon or unburned hydrocarbons from exhaust sensors 174a, 174b. The IED 110 may be in wired or wireless communication with the coolant thermometers 170a, 170b, the exhaust thermometers 172a, 172b, and the exhaust sensors 174a, 174b.

A monitored equipment interface 116 may be in communication with monitored equipment of the electric power delivery system such as the smart distribution node 102 for sending signals to the equipment and receiving status signals from the equipment.

A communication interface 118 may facilitate communications with various other devices either directly or, as illustrated, via a network 180. For example, the communication interface 118 may facilitate communications with the electric power generators 162, 164, the coolant thermometers 170a, 170b, the exhaust thermometers 172a, 172b, and the exhaust sensors 174a, 174b. Suitable networks for configuration and/or use as described herein include one or more local area networks, wide area networks, metropolitan area networks, Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer system may function both as a client and as a server.

IED 110 may include a processor 112 for executing instructions. The processor 112 may be implemented as a field-programmable gate array (FPGA), microprocessor, application specific integrated circuit, or the like.

The storage media 114 may be a repository for computer instructions, stored as modules 130, to be executed by the processor 112, data 140, settings, samples, and the like. Storage media 114 may include a single or multiple physical storage media, one or more of which may be packaged with the processor 112. The storage media 114 may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

The data 140 may include data from the power sensor 122, the coolant thermometers 170a, 170b, the exhaust thermometers 172a, 172b, and the exhaust sensors 174a, 174b (operational history 142), setpoints 144, and data generated by the IED 110, such as by the modules 130 or other modules. The data 140 stored may be organized as one or more memory registers/addresses, files, and/or databases. The data 140 may include an operational history 142 of the electric power generators 162, 164. The operational history 142 may include exhaust sensor data, temperature data, and power output level history.

The modules 130 may include a residue tracker 132, a mitigation manager 134, and a prevention manager 136. The modules 130 may run multiple operations serially, concurrently or in parallel with the one or more processors 112.

The residue tracker 132 may determine an amount of accumulated residue for the electric power generators 162, 164. The level of wet stack residue accumulation can be estimated via various methods. In some embodiments, the residue tracker 132 may determine that a diesel engine operates at a consistently low power level causing the diesel engine to accumulate residue and request that the mitigation manager cause the diesel engine to undergo periodic mitigation.

In some embodiments, the residue tracker 132 may estimate the residue level by tracking a power history of each of the electric power generators 162, 164 as powered by diesel engines. The power history may include the power output of the generator and/or the power output as a percentage of rated power of the generator. In general, a diesel engine operating at low power levels (as indicated by the setpoints 144, e.g., below 30%) will tend to accumulate residue. Thus, the residue tracker 132 may identify a diesel engine as requiring wet stack mitigation after a certain number of operational machine-hours at a low power level. Similarly, in some embodiments, the residue tracker 132 may estimate an amount of residue burned off when the diesel engine operates at high power levels (as indicated by the setpoints 144, e.g., above 80%).

In some embodiments, for the residue tracker 132 to estimate a current level of residue buildup, the residue tracker 132 may establish an operational curve. The operational curve is based on the power history across a period of time to specify a wet stacking residue accumulation/burn-off rate. The residue tracker 132 may determine an accumulation rate curve (both positive and negative) as a function of power level and/or other factors such as exhaust temperature and integrate the accumulation rate curve over time to determine the wet-stack accumulation level. The residue tracker 132 may integrate the accumulation rate curve of the power history over time to track the level of residue buildup to generate the operational curve. For example, to obtain the operational curve, the residue tracker 132 may integrate an accumulation rate of the power history between the power history and a low power level threshold to determine an accumulation rate. In other words, the integral is defined for the area between the lower power level threshold and the power history. To find a burn-off rate, the residue tracker 132 may integrate the power history above a high power level threshold. In other words, the integral is defined for the area between the upper power level threshold and the power history. The residue tracker 132 may estimate the residue accumulation as zero for times when the generator is operating within the thresholds or when the generator is not operating. The residue tracker 132 may use the estimated accumulation and burn-off rates to estimate a residue amount. Once the residue estimate reaches a critical threshold(s) the residue tracker 132 identifies the diesel engine as requiring mitigation.

In some embodiments, the residue estimate is based on one or more of measurements of power, measurements of coolant temperature, measurements of exhaust temperature, and measurements of exhaust content such as particulate carbon or unburned hydrocarbons. For example, the operational curve representing the rate of residue buildup may be decreased if the exhaust temperature is above a threshold temperature. Further, the critical threshold(s) may be pre-defined value(s) set by a generator manufacturer or a user. In some embodiments, the residue tracker 132 calculates the critical threshold(s) using environmental factors. These factors may include altitude, air temperature, humidity, air pollution levels, etc. In some embodiments, the residue tracker 132 calculates the critical threshold(s) using fuel type and quality of fuel.

In some embodiments, the critical threshold(s) may include three threshold values. The threshold values may be included in the setpoints 144 stored on the storage media 114. The residue tracker 132 may characterize the level of wet stack residue buildup based on which threshold value the residue has exceeded. Each threshold may require different mitigation strategies. For example, a first threshold value may be used to identify a residue build-up level that is present but may burn off if the machine is consistently operated at a moderate power level (as indicated by the setpoints 144, e.g., 60%). A second threshold value may be used to identify a residue build-up level that can be mitigated through operating at a high power level (as indicated by the setpoints 144, e.g., 80%). A third threshold value may be used to identify a residue build-up level that requires an engine overhaul to mitigate.

In some embodiments, the residue tracker 132 may alert a user of the need to mitigate and the characterization of the residue buildup (e.g., the mitigation technique available for the level of residue buildup). In some embodiments, the residue tracker 132 may send a signal to the mitigation manager 134 to automatically initiate a mitigation procedure.

A system that tracks power history and other factors that affect wet stacking residue accumulation using the residue tracker 132 could allow mitigation activities to be performed only when actually needed and only to the degree required to mitigate the accumulated residue. By tracking both buildup and burnoff, the partial mitigation due to normal operation at higher levels can be accounted for. In some situations, dynamic re-dispatch of online generators may be able to avoid the use of dedicated mitigation activities. For example, the prevention manager 136 can be used to cause some generators to operate at a high level during normal use to burn off residue before dedicated mitigation is needed.

When dedicated mitigation activities are required, the residue tracker 132 may be used to perform the mitigation more efficiently. For example, the residue tracker 132 may track the accumulation/burnoff during mitigation operations and will determine when mitigation operations may be suspended and take action accordingly.

One way to mitigate the wet stack residue accumulation is to operate the machines at a high power level (e.g., greater than 80% of rated power of the generator) for several hours by attaching a resistive load bank to increase the machine load and operate the machine at near full power for greater than eight hours. This is effective at mitigating the buildup but expends significant fuel in the process. This method is undesirable since it increases operational costs because of the cost of purchasing additional fuel and purchasing, transporting, and maintaining the load bank. Further, as diesel generation is often used in remote areas, the expense of transporting the fuel to the generator location is also a significant cost.

The mitigation manager 134 may reduce the accumulated residue more efficiently than attaching a load bank. In some embodiments, the mitigation manager 134 may prepare dispatch instructions for the electric power generators 162, 164 to reduce the wet stack residue. For example, to mitigate the wet stack residue the mitigation manager 134 may cause a diesel engine of one of the generators to operate at a high power level (e.g., greater than 80% of rated power) for several hours when the residue tracker 132 determines mitigation is needed. As the residue tracker 132 tracks residue accumulation, mitigation occurs when and where it is necessary and the IED 110 avoids mitigation when it is not necessary.

In some embodiments, mitigation may still be done manually with a load bank. However, the residue tracker 132 may alert the user of the need for mitigation and alert the user when mitigation is complete.

When the residue tracker 132 identifies a generator needing mitigation, the mitigation manager 134 may perform mitigation in a variety of ways. For example, the residue tracker 132 causes a load to be added to the identified generator. For instance, a second generator may be connected to the identified generator with the second generator operating in parallel with zero fuel (e.g., acting as a compressor or Jake Brake). The parallel generator may eliminate a need to have a separate load bank. The parallel generator may be coupled to the identified generator manually or the mitigation manager 134 may open and close a set of circuit breakers to couple the generators in parallel.

In some embodiments, the mitigation manager 134 establishes an automatic generator power dispatch program that periodically sets one or more generator(s) to a high power level to mitigate wet stack residue accumulation.

In some embodiments, the mitigation manager 134 dynamically changes the dispatch instructions for multiple generators so that one generator operates at a high level for a period of time. Once that generator is mitigated, the mitigation manager 134 may change the dispatch instructions to mitigate another machine requiring mitigation. The mitigation manager 134 may perform dynamic dispatch to compensate for rapid load changes that would tend to overload a machine undergoing wet stacking mitigation. For example, the dispatch instructions may cause machines not undergoing mitigation to pick up additional load while keeping the machine undergoing mitigation at a constant, high power level.

In some embodiments, the mitigation manager 134 may throttle the coolant valve to reduce the power level which results in an exhaust system temperature sufficiently high to burn off wet stacking residue. The mitigation manager 134 may use one technique or a combination of techniques described above to mitigate wet stack residue.

The prevention manager 136 may attempt to prevent or reduce accumulation of residue minimizing the time a generator is operated below an identified low power level (e.g., 30%). The identified low power level may be dependent on fuel control (electronic vs. mechanical injection) and environmental factors (altitude, temperature, humidity, etc.). One of the most straightforward methods of avoiding wet stack residue accumulation is to turn the machine off when it will be operating at a low power level. This is, of course, complicated by load requirements such as being able to start up loads as necessary. The prevention manager 136 can implement various methods to overcome the challenges presented by a load requirement and load startup.

The prevention manager 136 may communicate with the smart distribution node 102 to perform load management to prevent buildup. The smart distribution node 102 may have a distribution port that selectively couples loads to the one or more diesel engines via a port breaker. The system may include a plurality of smart distribution nodes to control one or more loads. The smart distribution node 102 may report information regarding a load attached to the distribution port before coupling the load to the electric power generators 162, 164.

In some embodiments, the prevention manager 136 may manage loads using a permissive based start-up configuration. For example, the smart distribution node 102 may send a request from a first smart distribution node to start an attached load, the request including a report with information regarding the attached load. The information may include expected load or maximum load. The prevention manager 136 may determine if there is a reserve margin of the one or more diesel engines sufficient for the attached load. If the reserve margin is insufficient to start the load, the prevention manager 136 may provide a delay instruction to the smart distribution node 102 to prevent the smart distribution load from coupling the load to the electric power generators 162, 164. If the reserve margin is sufficient, the prevention manager 136 may provide dispatch instructions, based on the report from the smart distribution node 102, to the one or more diesel engines to maintain the one or more diesel engines operating above the target threshold when the first smart distribution node closes an associated port breaker.

The level of reserve margin is dependent on many factors, including load startup transients, which loads and what sizes of loads may start up without warning, and what other attached devices (such as battery-operated lighting modules) might temporarily act as sources of power.

In some embodiments, the prevention manager 136 may manage loads using load prioritization. If a high priority load needs to start and there is insufficient reserve margin, the prevention manager 136 may temporarily suspend a lower priority load. The prevention manager 136 may send instructions to bring additional generators online and send instructions to resume the lower priority load once additional generation is brought online. The smart distribution node 102 may provide the prevention manager 136 with a priority for the load. The prevention manager 136 may maintain a load prioritization index that indicates a priority for the loads.

In some embodiments, the prevention manager 136 may send dispatch instructions to the generators to allow temporary overload for load startup. Many loads have short-term high-level power draws when they start up, but decrease to a lower operating power. The prevention manager 136 may provide the generators with permission to operate above their steady-state limits for short periods of time to enable these loads to start.

In some embodiments, the prevention manager 136 may send dispatch instructions to the generators to allow temporary overload during startup of an additional generator. Diesel generators can perform start-up and synchronization operations quickly. If a load starts up and causes the online generators to exceed their steady-state rating, the prevention manager 136 may provide the generators with permission to operate above this level long enough to bring additional generators online, after which they will be operating below their rating.

The prevention manager 136 may track a variety of factors to determine appropriate dispatch instructions. In some embodiments, the prevention manager 136 sends dispatch instructions to start and stop generators based on real-time measurements of system load. In some embodiments, the prevention manager 136 tracks a minimum margin of spinning reserve required to start loads. In some embodiments, the prevention manager 136 tracks the level to which machines can operate above their rated steady-state power level. In some embodiments, it may be determined that an emergency situation exists that shifts the priority from wet stack prevention to ensuring continuity of power. This "Battle-short" condition would further enable excursions of operating parameters that would normally be maintained to prevent equipment damage. The prevention manager 136 may compare this information against a time required to start and synchronize a load or another generator and restore the operating generators to a level below their maximum steady-state level.

In some embodiments, the prevention manager 136 may use alternate sources (e.g., battery, solar PV, etc.) to supplement a temporary transient power draw to allow operating with less reserve margin or facilitate longer start-up and synchronization times.

In some embodiments, the prevention manager 136 may use information from smart distribution nodes which report the maximum or expected loads that their distribution ports are attached to. A request to close a port breaker would inform the prevention manager 136 that the load may increase requiring additional generator margin. In some embodiments the request may include load priority. In some embodiments the request may include attached load real and reactive power draw. In some embodiments the request may include amplifying load information such as start-up power/current, steady-state power/current, or load dynamics (e.g., steady state vs. pulsed load, min/average/max typical power draw).

Figure 2:
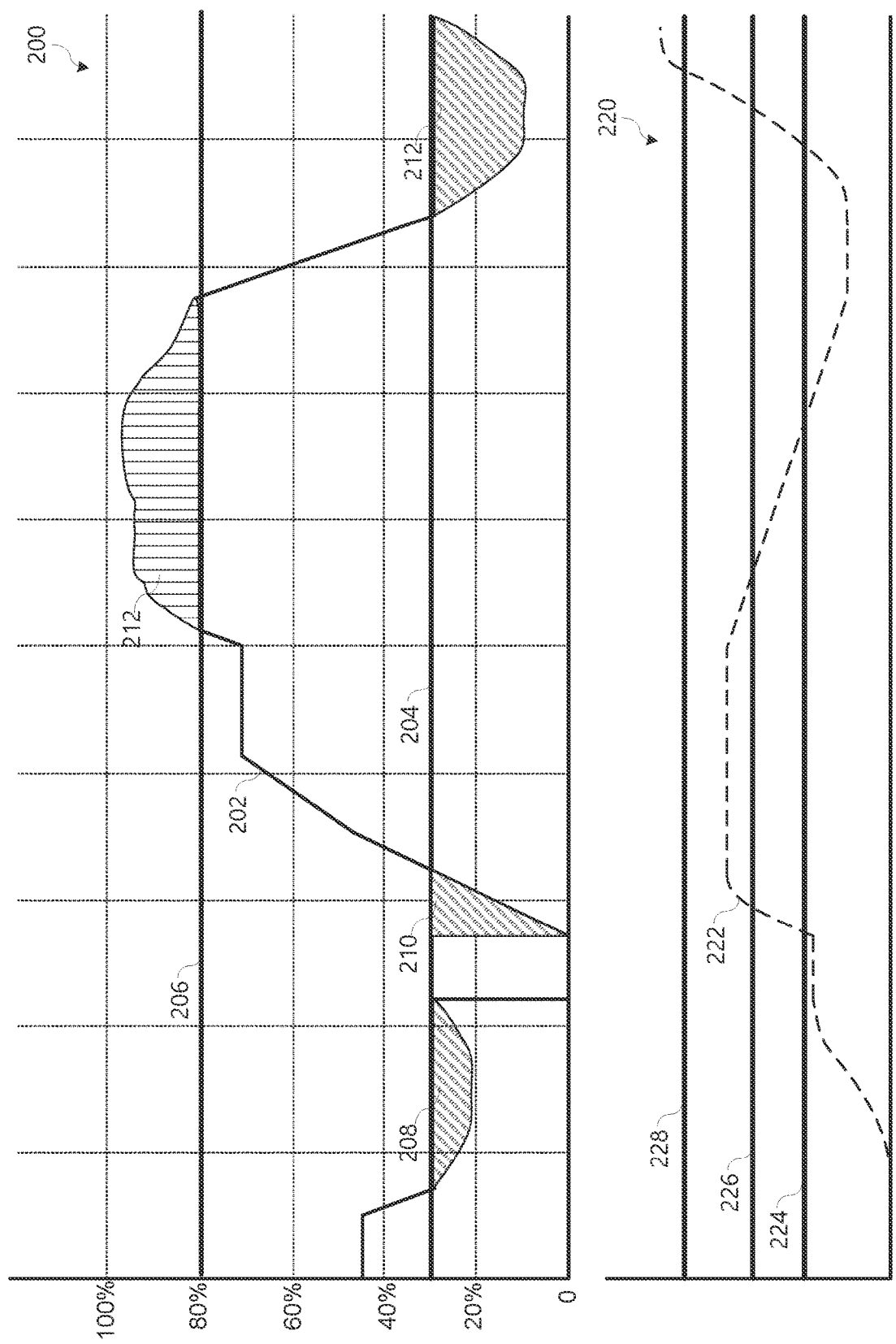
FIG. 2 illustrates a first graph with a power history indicating operating power level of a generator over time, and a second graph illustrating wet stack residue level over time.

FIG. 2 illustrates a first graph 200 with a power history 202 indicating operating power level of a generator over time, and a second graph 220 illustrating wet stack residue level 222 (i.e., operational curve) over time. The first graph 200 includes a low power setpoint 204 indicating a power level below which residue will accumulate. The first graph 200 includes a high power setpoint 206 indicating a power level below which residue will burn off. The second graph 220 includes three mitigation setpoints or critical residue thresholds. A first mitigation set point 224 indicates a point at which residue buildup is present but may burn off if the generator is consistently operated at a moderate power level (e.g., 60%). A second mitigation setpoint 226 indicates a point at which residue buildup is present but can be mitigated through operating at high power level (e.g., 80%). A third mitigation set point 228 indicates a point when residue buildup requires engine overhaul to mitigate.

The first graph 200 illustrates three periods of time 208, 210, and 212, where the power history 202 is below a low power setpoint 204. As shown in the second graph 220 during these times, the wet stack residue level 222 increases. The rate at which the wet stack residue level 222 increases may be variable based multiple factors. For example, the rate at which the wet stack residue level 222 increases may vary based on exhaust temperature and/or power level of the generator.

After the first two wet stack residue level 222 increases, a system may identify that the wet stack residue level 222 is above the second mitigation setpoint 226. Accordingly, the system can cause the generator to operate above the high power setpoint 206 during a burn-off time period 212. As shown in the second graph 220, while the power history 202 is above the high power setpoint 206 the residue decreases. The rate at which the wet stack residue level 222 decreases may be variable based multiple factors. For example, the rate at which the wet stack residue level 222 decreases may vary based on exhaust temperature and/or power level of the generator. After the wet stack residue level 222 increases above the third mitigation setpoint 228 the system may send an alert to the user that an engine overhaul is needed.

Figure 3:
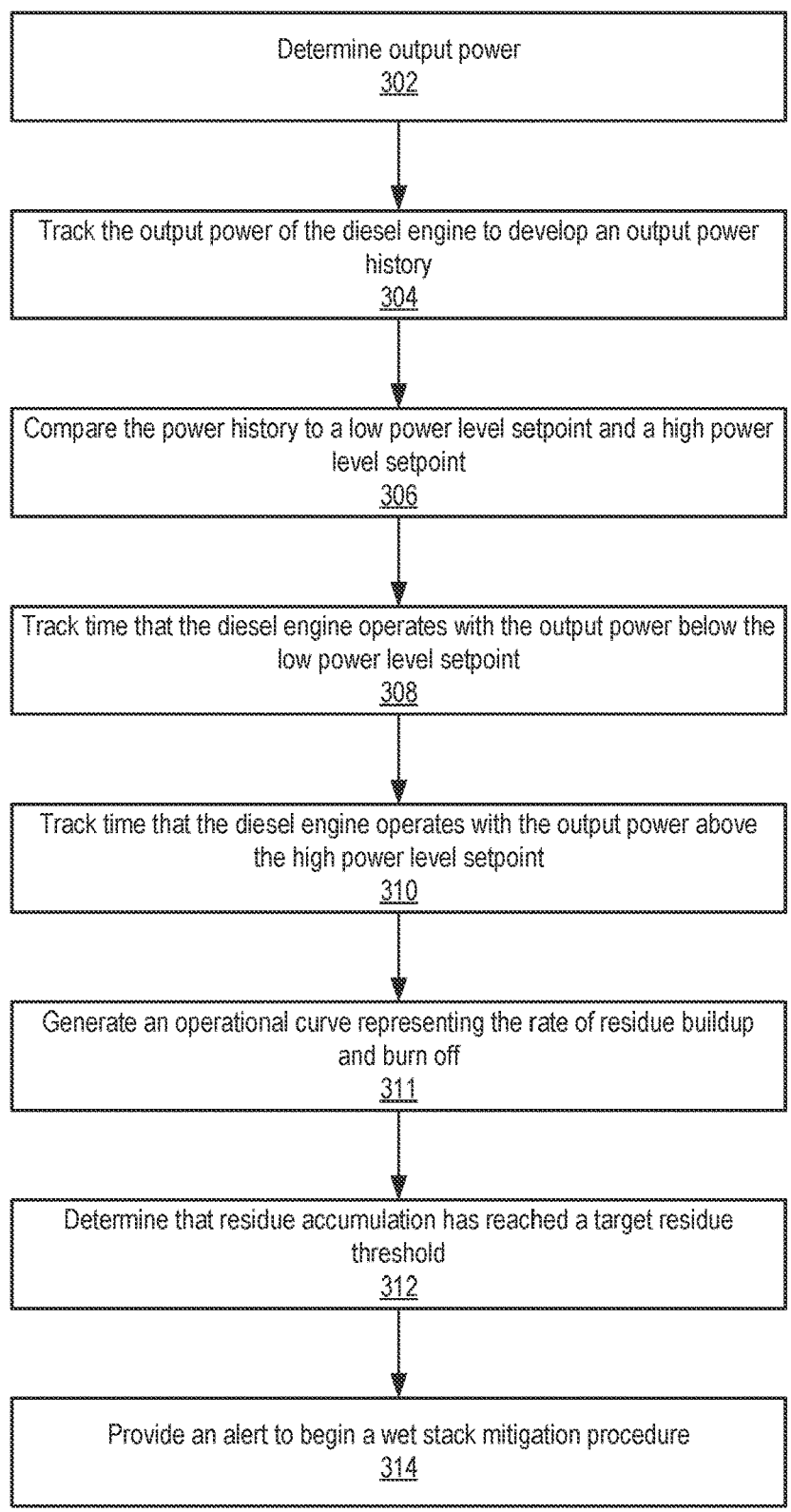
FIG. 3 is a flow chart of a method for monitoring wet stack residue accumulation, according to one embodiment.

FIG. 3 is a flow chart of a method 300 for monitoring wet stack residue accumulation, according to one embodiment. The method 300 may be implemented by an IED (such as the IED 110 of FIG. 1). The IED may determine 302 output power of a diesel engine. To determine 302 the output power, the IED may directly measure current and voltage or receive power data from an external sensor.

The IED may track 304 the output power of the diesel engine to develop an output power history. The IED may compare 306 the power history to a low power level setpoint and a high power level setpoint. The IED may track 308 an amount of time that the diesel engine operates with the output power below the low power level setpoint, and track 310 an amount of time that the diesel engine operates with the output power above the high power level setpoint to generate 311 an operational curve representing the rate of residue buildup and burnoff.

The IED may determine 312 that residue accumulated in the diesel engine has reached a target residue threshold. In some embodiments, the residue accumulation is based on determining that the diesel engine has operated at below the power level setpoint for an accumulated duration that exceeds a target duration. In some embodiments the accumulated duration may include the time spent operating under the low power level setpoint reduced by the time spent operating above the high power level setpoint. In some embodiments, the residue accumulation is based on the area between the power history and the setpoints. For example, the IED may integrate the power history to obtain the area between the power history and the low power level setpoint and reduce that amount by an integral of the power history to obtain the area above the high power level setpoint. In some embodiments the IED is further to track one or more of coolant temperature, exhaust temperature, and exhaust content, wherein determining that the residue threshold has been reached is based on one or more of the coolant temperature, the exhaust temperature, and the exhaust content. In some embodiments, the residue threshold is a predefined value or a predefined curve. In some embodiments, the residue threshold is a threshold value based on one or more of environmental factors, fuel type, and fuel quality.

The IED may provide 314 an alert to begin a wet stack mitigation procedure. In some embodiments the alert is sent to a user interface to alert a user to begin a mitigation procedure. In some embodiments, the alert is sent to a mitigation controller to automatically initialize a mitigation procedure. For example, the mitigation controller may alter 316 a load associated with the diesel engine to increase an output power level of the diesel engine and burn off wet stack residue.

In some embodiments, the IED may characterize a level of residue buildup based on what mitigation procedure is recommended. The mitigation procedures may include operating the diesel engine at a high power level; overhauling the diesel engine; and operating the diesel engine at a moderate power level.

Figure 4:
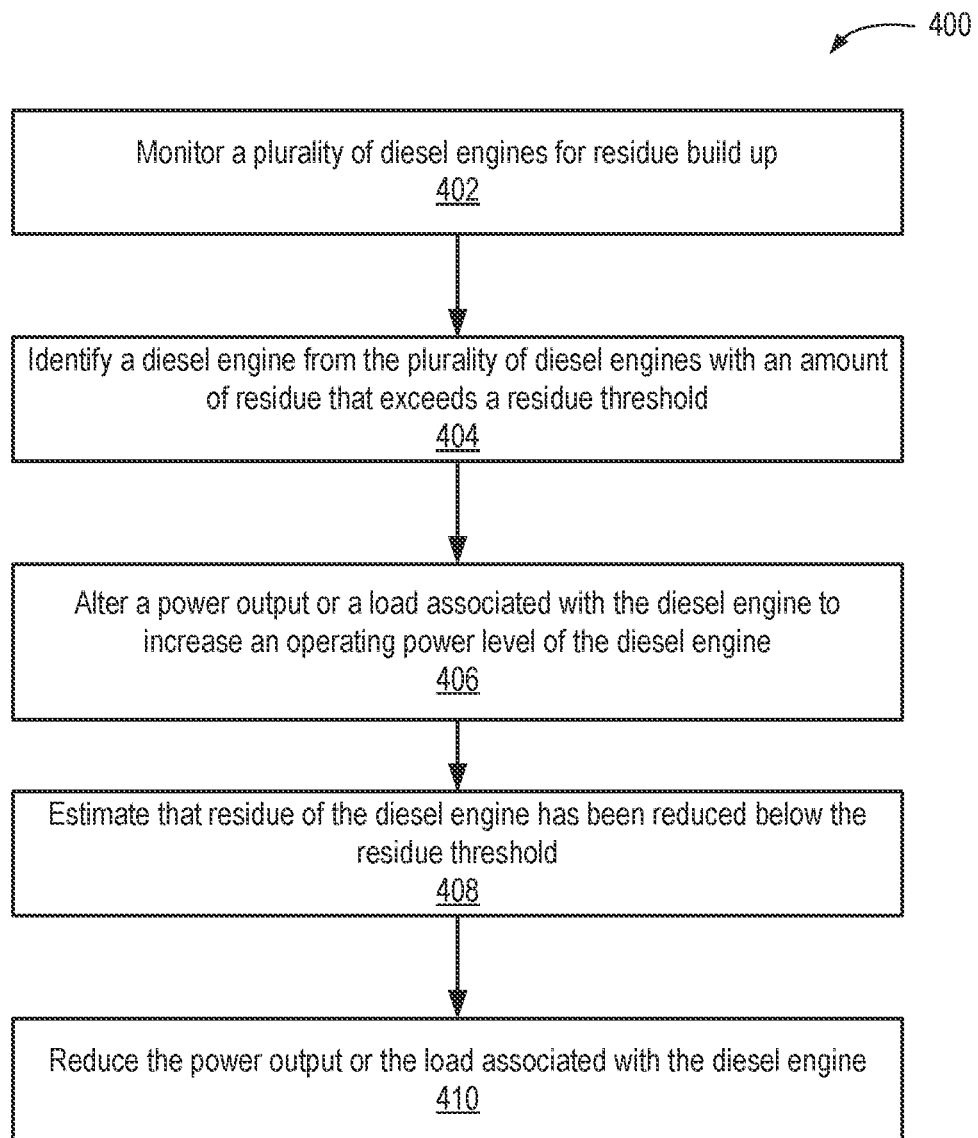
FIG. 4 is a flow chart of a method for mitigating wet stack residue accumulation, according to one embodiment.

FIG. 4 is a flow chart of a method 400 for mitigating wet stack residue accumulation, according to one embodiment. The method 400 may be implemented by an IED (such as the IED 110 of FIG. 1). The IED may monitor 402 a plurality of diesel engines for residue buildup. The IED may further identify 404 a diesel engine from the plurality of diesel engines with an amount of residue that exceeds a residue threshold.

The IED may alter 406 a power output of the diesel engine or a load associated with the diesel engine to increase an operating power level of the diesel engine. In some embodiments, altering the load comprises placing a second diesel engine in parallel with the diesel engine, and operating the second diesel engine at zero fuel. In some embodiments, altering the load comprises sending dispatch instructions to the plurality of diesel engines to cause the diesel engines to increase the operating power level. In some embodiments, the IED establishes a dispatch program that periodically sets one or more diesel engines of the plurality of diesel engines to a high operating power level to mitigate wet stack residue accumulation. For example, every two hours the dispatch program may set one or more generators to operate above a 80% operating power level and decrease other generators' output power. The higher operating power level command may be rotated so that each generator is operated at a higher power level for a scheduled period.

The IED may estimate 408 that residue of the diesel engine has been reduced below the residue threshold based on an amount of time at an increased operating power level. After the residue has been decreased, the IED may reduce 410 the power output or the load associated with the diesel engine to lower the operating power level.

Figure 5:
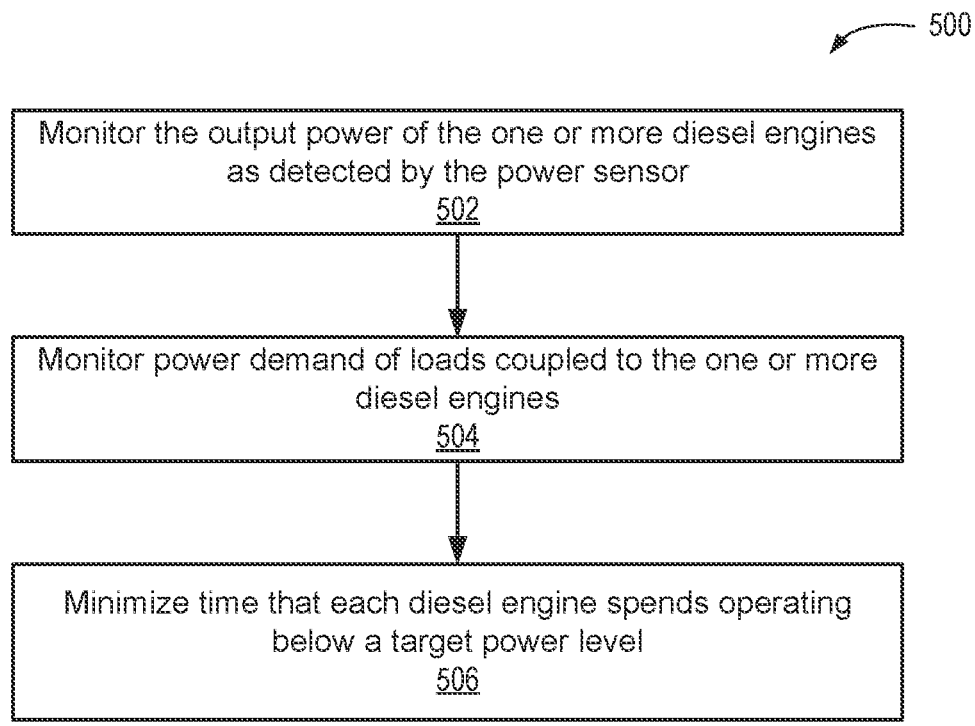
FIG. 5 is a flow chart of a method for preventing wet stack residue accumulation, according to one embodiment.

FIG. 5 is a flow chart of a method 500 for preventing wet stack residue accumulation, according to one embodiment. The method 500 may be implemented by an IED (such as the IED 110 of FIG. 1). The IED may monitor 502 the output power of the one or more diesel engines as detected by the power sensor. The IED may also monitor 504 power demand of loads coupled to the one or more diesel engines.

The IED minimizes 506 time that each diesel engine spends operating below a target power level by controlling at least one of the output power of the one or more diesel engines and the power demand of the loads. In some embodiments, the target power level is set at 30% of capacity for each of the one or more generators. In some embodiments, the target power level is set based on a fuel control type and environmental factors.

In some embodiments, the IED may control which loads are allowed to turn on to minimize low power operation of the diesel engines. For example, the IED may receive a request from a first smart distribution node to start an attached load, the request including a report with information regarding the attached load. The information may include the maximum or expected load. The IED may determine if a reserve margin of the one or more diesel engines is sufficient for the attached load. If the reserve margin is insufficient, the IED may provide a delay instruction to the first smart distribution node. If the reserve margin is sufficient, the IED may provide dispatch instructions, based on the report from the first smart distribution node, to the one or more diesel engines to maintain the one or more diesel engines operating above the target threshold when the first smart distribution node closes an associated port breaker.

In some embodiments, to minimize the time that each diesel engine spends operating below the target power level, the IED sends an updated dispatch instruction to the one or more diesel engines based on current measurements from the load sensors. For example, the updated dispatch instructions may provide for temporary overload of the one or more diesel engines during a load start-up period. In some embodiments, to minimize the time that each diesel engine spends operating below the target power level, the IED provides dispatch instructions to the one or more diesel engines giving permission to temporarily exceed their steady-state rating during the startup of an additional diesel engine.

In some embodiments, to minimize the time that each diesel engine spends operating below the target power level, the IED maintains a load prioritization index that indicates a priority for the loads, and suspends operation of a lower priority load when there is insufficient reserve margin to start a higher priority load. The IED may request that an additional diesel engine start and synchronize, and resume operation of the lower priority load when the additional diesel engine is started.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

The invention claimed is:

1. A method to mitigate wet stack residue, the method comprising:
   monitoring a plurality of diesel engines for residue buildup;
   identifying a diesel engine from the plurality of diesel engines with an amount of residue that exceeds a residue threshold;
   altering a power output of the diesel engine or a load associated with the diesel engine to increase an operating power level of the diesel engine;
   estimating that residue of the diesel engine has been reduced below the residue threshold based on an amount of time at an increased operating power level; and
   reducing the power output of the diesel engine or the load associated with the diesel engine to lower the operating power level.

2. The method of claim 1, further comprising altering the load associated with the diesel engine, wherein altering the load comprises placing a second diesel engine in parallel with the diesel engine, and operating the second diesel engine at zero fuel.

3. The method of claim 1, further comprising establishing a dispatch program that periodically sets one or more diesel engines of the plurality of diesel engines to a high operating power level to mitigate wet stack residue accumulation.

4. The method of claim 1, wherein altering the power output or the load comprises changing dispatch instructions to the plurality of diesel engines to cause the diesel engine to increase the operating power level.

* * * * *